United States Patent

[11] 3,607,878

| [72] | Inventors | Edouard Grimaud<br>Oullins;<br>Pierre Plurien, Palaiseau; Maurice<br>Troussier, Pierre Benite, all of France |
|---|---|---|
| [21] | Appl. No. | 20,464 |
| [22] | Filed | Mar. 5, 1970 |
| [45] | Patented | Sept. 21, 1971 |
| [73] | Assignee | Societe D'Electro-Chimie, D'Electro-<br>Metallurgie Et Des Acieries Electriques<br>D'Ugine |
| [32] | Priority | June 18, 1965 |
| [33] | | France |
| [31] | | 21,500 |
| | | Continuation of application Ser. No.<br>557,464, June 14, 1966, now abandoned. |

[54] METHOD OF POLYMERIZATION OF TETRAFLUORETHYLENE
8 Claims, 1 Drawing Fig.

[52] U.S. Cl. ..................................... 260/29.6,
260/33.6, 260/92.1, 260/539
[51] Int. Cl. ..................................... C08f 3/24,
C08f 45/24
[50] Field of Search .......................... 260/29.6 F,
92.1

[56] References Cited
UNITED STATES PATENTS

| 2,559,752 | 7/1951 | Berry | 260/29.6 |
|---|---|---|---|
| 2,750,350 | 6/1956 | Kroll | 260/29.6 |
| 3,009,892 | 11/1961 | Duddington et al. | 260/29.6 |

*Primary Examiner*—Murray Tillman
*Assistant Examiner*—H. Roberts
*Attorney*—Bacon & Thomas ABSTRACT: An improved process for the production of aqueous colloidal dispersions of tetrafluoroethylene polymer wherein tetrafluoroethylene monomer is polymerized in the presence of water, a catalyst and a dispersing agent. The improvement comprising progressively introducing tetrafluoroethylene monomer and a dispersing agent into a reaction vessel wherein a small concentration of dispersing agent is present prior to the beginning of polymerization, at a rate which provides a concentration of dispersing agent which at each instant does not exceed by more than 10 percent the theoretical concentration required to provide continuous coverage of the entire surface of the polymerized particles formed with dispersing agent but which is sufficient to provide continuous coverage of at least 60 percent of the surface of said particles with dispersing agent.

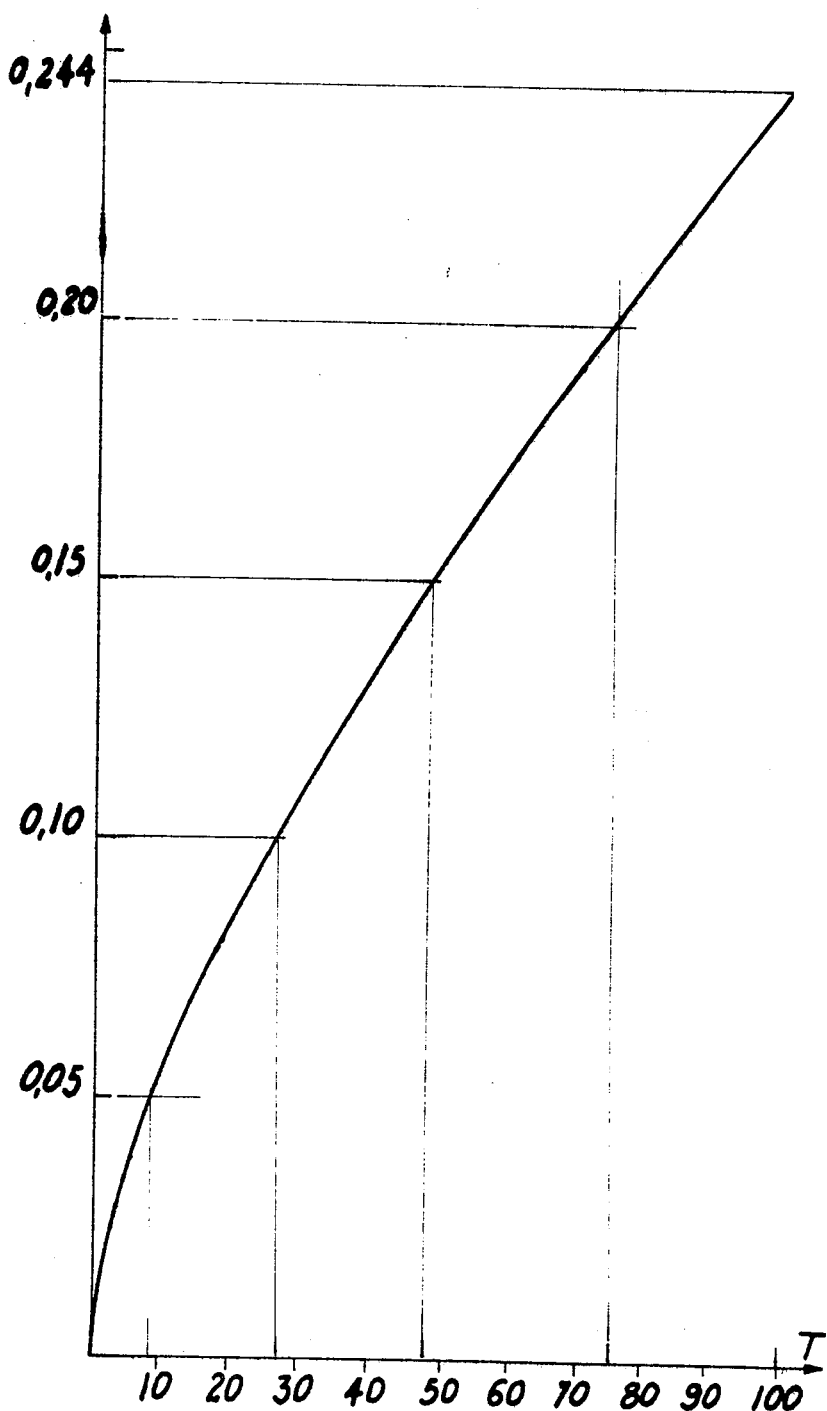

METHOD OF POLYMERIZATION OF TETRAFLUORETHYLENE

This application is a continuation of Ser. No. 557,464, filed June 14, 1966, now abandoned.

This invention relates to a method of polymerization of tetrafluoroethylene in aqueous emulsion which makes it possible to obtain dispersed particles of polymers which are regular in shape and dimensions. The invention also has for its object the dispersions of polytetrafluoroethylene (PTFE) which are obtained by means of this method.

It is known to carry out the polymerization of tetrafluoroethylene and also of various other monomers by contacting the monomer with an emulsifying agent in the presence of water and conventional agents such as a starting agent, a buffer agent and the like. The monomer and the emulsifying agent may be introduced progressively into the reaction vessel.

However, when this conventional method is applied to the polymerization of tetrafluoroethylene, it results in dispersions of polymers in water, in which the particle size cannot readily be controlled and is very irregular.

Analysis of such a dispersion by electron microscopy reveals that elongated particles and sometimes even veritable filaments of polymer are formed next to particles of spheroidal shape. This irregularity of size and shape of particles is correspondingly greater when it is sought to prepare dispersions of particles having smaller mean dimensions.

A further disadvantage of the methods hitherto employed lies in the fact that they do not make it possible to obtain dispersions which have a high concentration of polymer, thereby entailing time-consuming concentration processes.

The object of this invention is to permit the production of dispersions of polytetrafluoroethylene in water, in which the particles have shapes and dimensions which are much more regular than those produced by conventional methods. It is also an object of the invention to permit the attainment of high concentrations of polymer.

To this end, the invention proposes a method of polymerization of tetrafluoroethylene in emulsion in water which entails contacting gaseous monomeric tetrafluoroethylene with an emulsifying agent, in the presence of water and usual agents such as a starting agent and/or buffer agent in particular, the monomer and emulsifying agent being introduced progressively into the reaction vessel at such rates that the concentration of emulsifying agent is at each moment substantially proportional to the total surface area of the polymerization particles which are formed in order to ensure that at least 60 percent of the surface area of said particles is continuously covered with emulsifying agent.

The introduction of the monomer and of the emulsifying agent into the reaction vessel can be carried out either continuously or in successive doses. In the latter case, the doses of monomer and of emulsifying agent can be introduced either simultaneously or in alternate sequence. The reaction is preferably carried out at a pressure between 5 and 25 atmospheres.

In accordance with a secondary feature of the invention, said emulsifying agent consists of an alkali or ammonium salt of fluoric chlorofluoric aliphatic carboxylic acids having a chain which comprises at least six carbon atoms.

The method in accordance with the invention thus makes it possible to obtain, for example, dispersed particles of regular shape having a size within the range 0.01 $\mu$ to 1 $\mu$; furthermore, it proves feasible to produce dispersions of polymer in which the concentration of polymer can attain 45 percent whereas the concentration permitted by methods of the prior art scarcely exceeded 25 percent.

The progressive introduction of emulsifying agent, the quantity of which remains substantially proportional to the total surface area of the particles of polymer which are formed makes it possible to ensure good stability of the dispersed articles.

Extensive studies of the process of polymerization of tetrafluoroethylene have shown that the irregularity of the size and shape of dispersed particles is essentially dependent either on phenomena of agglomeration of particles due to lack of stabilizing agent or, on the contrary, to the generation and development of fresh particles which are induced by a substantial excess of stabilizing agent. The quantity of emulsifying agent which is present at each moment during the polymerization must be such that the particles are covered over the greater part of their surfaces with a layer of emulsifying agent.

The stability which is obtained can be explained on the basis of researches made by the present inventors as follows. The polymerization of gaseous tetrafluoroethylene which is carried out under pressure is essentially different from conventional polymerizations in aqueous emulsion utilizing a liquid monomer. In the case, for example, of the polymerization of styrene or of vinyl chloride, the liquid monomer is capable of dissolving or at least of swelling the particles of polymer which are formed. These particles which are swollen by the monomer are caused by the action of surface tension to assume a roughly spherical shape and the kinetics of the polymerization comply with well established laws.

On the contrary, in the case of tetrafluoroethylene, a monomeric gaseous phase is usually maintained above the aqueous phase without thereby resulting at any moment in condensation of the monomer in liquid form; moreover, even in the presence of liquid tetrafluoroethylene, polytetrafluoroethylene would not exhibit any swelling since it is strictly insoluble in its monomer.

It seems that this difference in behavior of tetrafluoroethylene is responsible for the fact that the grains of polymer which are formed are not spontaneously spherical and regular in the methods which were known prior to this invention. Depending on the conditions of polymerization, it is observed that these grains of polymer assume more or less distorted shapes ranging from the ellipsoid to the filament. The kinetics of polymerization of tetrafluoroethylene are also highly influenced by this particular behavior and no longer comply with the conventional laws which govern in particular the number of particles formed as a function of the concentration of emulsifying agent.

Systematic studies have served to show that it is possible to obtain approximately spherical particles having uniform and predetermined dimensions, even when the object contemplated is to prepare dispersions of particles having small mean dimensions (0.01 $\mu$ to 1 $\mu$, for example) provided that, in accordance with the invention, the concentration of emulsifying agent is constantly substantially proportional to the total surface area of the particles which are formed, that is to say to the power of two-thirds of the weight of polymer which is present at each moment so as to ensure the stability of the particles. In practice the concentration of emulsifying agent may not be quite proportional to the surface area of the particles. It may also be a little different from the theoretical concentration that would be required to cover the whole surface area of the particles. Thus, good results are obtained as long as the concentration of the emulsifying agent is sufficient to cover at least 60 percent of the total surface area of the particles of polymer and does not exceed the above theoretical concentration by more than 10 percent. The member of particles is thus kept substantially constant throughout the polymerization process.

When the emulsifying agent is employed in a discontinuous manner, the number of successive additions during the operation must be at least equal to 3, taking into account the initial introduction of emulsifying agent into the vessel either prior to or at the beginning of the polymerization. The emulsifying agent can also be added in the reaction vessel in a continuous manner throughout the course of the polymerization process.

The emulsifier can be employed either by direct introduction of this latter into the reaction vessel or by formation in situ, starting from a compound which is present in the reaction vessel and a compound which is introduced in continuous or discontinuous operation during the course of the polymerization.

A better understanding of the invention will be had from a perusal of the following description, wherein one mode of application of the method is given without implied limitation.

In a reaction vessel which has previously been degassed and filled with water, there are added a sufficient quantity of starting agent, a portion of the whole quantity of emulsifying agent, an agent which serves as a buffer in order to maintain the pH value of the solution at a suitable value and the monomer which is then introduced under pressure in successive doses; the emulsifying agent is in turn introduced at regular intervals during the course of the polymerization.

There is preferably employed as starting agent a redox-potassium persulfate-ferrous sulfate system, but any other mineral redox system would be equally suitable. The use of organic radical starting agents can also be contemplated: succinyl peroxide or glutaryl peroxide, for example, would be suitable.

The emulsifying agent which is employed belongs to the class of fluorinated or chlorofluorinated anion emulsifying agents and use is preferably made of alkali salts or ammonium slats of fluoric or chlorofluoric carboxylic acids having a chain comprising a number of carbon atoms which is at least equal to 6.

In the case of a given emulsifying agent, the quantity of emulsifying agent to be employed is determined approximately by calculation from the characteristics of the dispersion which it is desired to obtain, namely, concentration of polymer and particle diameter. According to these characteristics, the number of particles per unit of initial volume is calculated, then to total surface area of the particles and finally the quantities of emulsifying agent which are necessary for different degrees of progress of the polymerization.

N designating the number of polymer particles in a given volume of water,

D the diameter of said particles

P their weight

S their total surface area it appears that P varies directly as $D^3N$, where as S varies directly as $D^2N$.

It follows that the amount of emulsifying agent which is theoretically required to ensure that the whole surface of the particles is covered at any moment, varies directly as power two-thirds of the weight of polymer produced.

The requested weight E of emulsifying agent can be calculated, for various progressive stages of the polymerization process, in terms of the area $s$ covered by the unit weight of the emulsifying agent used. Thus, P and D being predetermined, N, S and then $E = S/s$ can be successively calculated.

It is also possible to calculate the total concentration E of the emulsifying agent when the polymerization process is completed, and deduct therefrom the concentration $E_t$ at time $t$ by restoring to the conversion rate T (the ratio, expressed in percent, of the weight of polymer produced at time $t$ to the total weight of polymer obtained at the end of the polymerization process), according to the following relation:

$$E_t = E(P_t/p)^{2/3} = (T/100)^{2/3}$$

The conversion rate T is easily determined by weighing the monomer submitted to polymerization. If the polymerization is achieved by successive steps where so that the pressure varies between two given volumes due to the addition of successive doses of monomer, the value of T can be rated after the number of pressure drops. The weight of polymer is then calculated in terms of the volume of the gaseous phase, the temperature, and the pressure.

The concentration E which is calculated is a theoretical value; in fact, it is difficult to know with any degree of accuracy the surface area which is protected by one molecule of emulsifying agent. Furthermore, in the case of polytetrafluoroethylene, it proves difficult to calculate the exact surface areas of the particles from their diameters since they are never strictly spherical. For the above reasons, the quantity of emulsifying agent which is obtained by calculation remains only indicative and it is only possible to determine the exact quantities by practical experimentation. However, in the case of particle sizes above 0.2 $\mu$, the calculated values are satisfactory.

The following nonlimitative examples are given in order to illustrate the invention more clearly.

Example 1

It is desired to prepare a regular dispersion of polytetrafluoroethylene (PTFE) having a concentration of 25 percent and a particle diameter of 0.3 $\mu$. There is employed as emulsifying agent the potassium salt of chlorofluoric acid corresponding to the formula $C_8F_{11}Cl_4O_2H$ and known commercially as VOLTALEF-8114 acid.

The following conditions are established by calculation:

Total weight of polymer to be formed for 100 cm$^3$ of water: W = 33.33 g.

Number of particles per 100 cm$^3$ of water: $N = 1.048 \cdot 10^{15}$

Total surface area of particles contained in 100 cm$^3$ of water: S = 296.3 m.$^2$ Total concentration of emulsifying agent: E = 0.244 g./100 cm.$^3$ of water Instantaneous concentration of emulsifying agent: $E_t$ = 0.244(T/100)$^{2/3}$ in g./100cm.$^3$ of water The polymerization is carried out at 15° C. in a stainless steel autoclave having a useful capacity of 170 liters and fitted with a stirring device. The autoclave is initially filled with 100 liters of demineralized water, 5 g. of potassium persulfate, 7.5 g. of Mohr's salt (ferrous ammonium sulfate), 400 g. of dipotassium phosphate, 50 g. of VOLTALEF– 8114 acid neutralized by potassium and 5 liters of paraffin oil. This oil is employed as adjuvant which serves to prevent the coagulation of the polytetrafluoroethylene (PTFE) when the conversion ratio becomes too high.

After degassing, monomeric tetrafluoroethylene is introduced into the autoclave until a relative pressure of 22 kgs./cm.$^2$ is attained. Stirring is then begun and the polymerization starts immediately, thereby resulting in a pressure drop within the autoclave. When the pressure reaches 20 kgs./cm.$^2$, the vessel is refilled with tetrafluoroethylene until a pressure of 22 kgs./cm.$^2$ is attained. It is shown by calculation that, under polymerization conditions, this operation must be repeated 32 times in order to obtain the desired quantity of polymer.

In this example, the emulsifying agent is introduced in five fractions so as to ensure that its concentration relative to the water is successively 0.05 %, 0.10 %, 0.15 %, 0.20 %, and 0.244 %. In order to ensure that there should never be a lack of emulsifying agent with respect to the quantity which is necessary for the purpose of covering all of the particles, the maximum conversion ratios which can be achieved by each of the concentrations of emulsifying agent chosen are accordingly determined. With this object in view, the curve shown in the single accompanying figure is plotted and gives the ideal concentration of emulsifying agent as a function of the conversion ratio T; there are plotted on this curve the values of concentration of emulsifying agent and the corresponding maximum conversion ratios are deduced therefrom.

In the present case, the results are recorded in the table below:

| Concentration of Voltalef acid in water | Conversion ratio |
| --- | --- |
| 0.05 % | 9.27 % |
| 0.10 % | 26.2 % |
| 0.15 % | 48.2 % |
| 0.20 % | 74.2 % |
| 0.244 % | 100 % |

Calculation reveals that the conversion ratios given above correspond respectively to the end of the third pressure drop, to the midpoint of the eighth pressure drop, to the beginning of the 15th and to the end of the 23rd. In accordance with this program three injections of 50 g. and one injection of 44 g. of $C_8F_{11}Cbh4O_2H$ acid are carried out by means of a convenient injector. The VOLTALEF acid is neutralized in the autoclave by the dipotassium phosphate which was initially introduced. After 32 successive pressure drops, the autoclave is degassed and opened.

The polymerization has lasted one hour. The emulsion which is obtained does not contain any coagulated polymer, has a concentration of 25 percent polytetrafluoroethylene and a pH value of 7.5. Analysis of this emulsion by electron microscopy shows that the dispersed particles are of spheroidal shape with diameters ranging from 0.25 to 0.35 $\mu$.

Example 2

A polymerization is carried out under the same general conditions but, instead of carrying out an injection of 44 g. of VOLTALEF acid at the end of the 23rd pressure drop, there is only performed one injection of 22 g. at this moment and a further injection of 22 g. at the end of the 27th pressure drop.

By virtue of this modification, the theoretical curve which is shown in the single accompanying figure is more closely followed at the end of polymerization. The dispersion obtained is even more uniform than in the previous example. The dispersed particles are more closely related to a sphere and the diameters are all very close to 0.3 $\mu$.

Example 3

Polymerization is carried out under the same general conditions as those of example 1 but in this case by introducing the entire quantity of VOLTALEF acid in the form of its potassium salt prior to polymerization, as was the practice in the prior art.

This operation results in a dispersion having a concentration of only 20 percent polytetrafluoroethylene inasmuch as a part of the polymer remains in coagulated form. The dispersed particles are mainly elongated and the ratio of length to diameter varies from 2 to 5. Furthermore, the elongate particles are not rectilineal in a large number of cases and exhibit more or less pronounced faults. The diameters of the particles vary between 0.1 and 0.2 $\mu$ and the lengths between 0.2 and 0.6 $\mu$.

Example 4

This example describes the preparation of a uniform dispersion of PTFE, the emulsifying agent being employed continuously throughout the operation.

The autoclave employed is the same as in example 1. The general conditions of polymerization are also the same. The only differences concern the emulsifying agent and the buffer salt.

The emulsifying agent is no longer the potassium salt of VOLTALEF-8114 acid but sodium salt. It is prepared in the form of a 15 percent aqueous solution and is introduced continuously by means of an injection pump. The total quantity of emulsifying agent which is expressed as VOLTALEF acid is, as in the case of the previous example, 244 g., namely 0.244 percent with respect to the water which is present in the autoclave at the end of the operation. The rate of introduction of the solution of emulsifier is regulated in such a manner as to follow as closely as possible the ideal program which is defined by the full-line curve of the single accompanying figure. The fact that water is introduced at the same time as the emulsifying agent is taken into account by reducing the initial filling of the autoclave to a corresponding extent.

So far as the buffer salt is concerned, instead of the 400 g. of dipotassium phosphate which were employed in the example 1, there is employed a mixture of 40 g. of sodium pyrophosphate and 6.5 g. of sodium hydroxide.

The operation lasts 1 hour and results in an emulsion which does not contain any coagulate. The pH value is 8. The particles are of extremely regular shape and their diameters are in the range of 0.25 to 0.30 $\mu$.

Example 5

According to the calculation of example 1, an injection program is established for the preparation of a 39 percent dispersion of PTFE with particles of 0.25 $\mu$.

Into a stainless steel autoclave of 32 liter capacity fitted with an anchor-type stirrer which rotates at 250 r.p.m., there are introduced 16 liters of demineralized water, 1.6 g. of potassium persulfate, 2.4 g. of Mohr's salt, 48 g. of dipotassium phosphate, 8 g. of VOLTALEF acid which is neutralized by potassium and 0.8 l. of paraffin oil. The reaction vessel being degassed and heated to 15° C, tetrafluoroethylene is then introduced until a relative pressure of 22 kgs./cm.$^2$ is attained. When the pressure has dropped to 20 kgs./cm.$^2$, tetrafluoroethylene is reintroduced until a pressure of 22 kgs./cm.$^2$ is attained, and so on in sequence. In all, 48 successive portions of tetrafluoroethylene including the initial portion were introduced. By means of an injector, there are introduced into the autoclave:

8 g. of VOLTALEF acid at the midpoint of the fourth pressure drop 8 g. of VOLTALEF acid at the midpoint of the tenth pressure drop 8 g. of VOLTALEF acid at the midpoint of the 18th pressure drop 8 g. of VOLTALEF acid at the midpoint of the 27th pressure drop 8 g. of VOLTALEF acid at the midpoint of the 39th pressure drop The operation lasts 2 hours and results in a dispersion having a pH value of 6.8 and a concentration of 38.6 percent polytetrafluoroethylene. The dispersed particles are for the most part of spheroidal shape and their mean diameter is in the vicinity of 0.25 $\mu$.

By introducing the entire quantity of VOLTALEF acid at the start of the operation, it has not proved possible in this autoclave to prepare dispersions of polytetrafluoroethylene containing more than 30 percent of solids, inasmuch as the formation of an increasingly substantial coagulate prevents any increase in concentration of the dispersion of polymer, even when the polymerization reaction is carried on for a very long time.

Example 6

Into a stainless steel autoclave of 32 liter capacity fitted with an anchor-type stirrer which rotates at 250 r.p.m., there are introduced 20 liters of demineralized water, 2 g. of potassium persulfate, 2.8 g. of Mohr's salt, 100 g. of sodium pyrophosphate and 32 g. of VOLTALEF acid which is neutralized by sodium hydroxide. After degassing, the reaction mass being maintained at 15°C., tetrafluoroethylene is introduced until a relative pressure of 22 kgs./cm.$^2$ is reached. When, as a result of the polymerization, the pressure has dropped to 20 kgs./cm.$^2$, tetrafluoroethylene is reintroduced until a pressure of 22 kgs./cm.$^2$ is reached, and so forth until ten successive portions of monomer have been added including the initial portion. During the polymerization, the VOLTALEF acid is introduced in two portions:

a first portion of 32 g. at the end of the second pressure drop;

a second portion of 16 g. at the end of the seventh pressure drop.

This acid is neutralized at the moment of mixing with the reaction mass by the sodium pyrophosphate and it is the alkali salt which is formed in situ which ensures the stabilization of the dispersed particles. The operation lasts 25 minutes and results in a dispersion having a pH value of 8.4 and a concentration of 10.8 percent polytetrafluoroethylene. The dispersed particles are of spheroidal shape and are of uniform size. The diameters of said particles are within the range 0.10 to 0.15 $\mu$.

A further operation is performed by introducing the entire quantity of VOLTALEF acid into the reaction vessel prior to the polymerization. All of the other operating conditions remain unchanged. There is thus obtained a very irregular dispersion in which a few spheroidal particles are observed, but above all small rods having a length which can attain and even exceed 10 times the diameter. This heterogeneity of size is no less substantial than that of shape inasmuch as the diameters of the spheroids and small rods which are present vary between 0.04 and 0.20 $\mu$.

Example 7

It has been sought in this example to form a dispersion of particles of regular shape and small size. With this object in mind, there are introduced into an autoclave of 32 liter capacity fitted with an anchor-type stirring device which rotates at 250 r.p.m., 20 liters of demineralized water, 2 g. of potassium persulfate, 2.8 g. of Mohr's salt, 200 g. of sodium pyrophosphate and 32 g. of VOLTALEF acid which is neutralized by sodium hydroxide. After degassing and setting the temperature at 15° C., the autoclave is loaded with tetrafluoroethylene until a relative pressure of 22 kgs./cm.$^2$ is obtained. After a pressure drop of 20 kgs./cm.$^2$, tetrafluoroethylene is reintroduced until a pressure of 22 kgs./cm.$^2$ is obtained and so on. The number of portions of monomer added including the initial portion is limited to 4.

There are injected:

20 g. of VOLTALEF acid at the end of the first pressure drop;

20 g. of VOLTALEF acid at the end of the second pressure drop;

20 g. of VOLTALEF acid at the beginning of the fourth pressure drop.

The operation lasts 7 minutes and results in a dispersion having a pH value of 8.9 and a concentration of 4.5 percent polytetrafluoroethylene. The dispersed particles of spheroidal shape have a mean diameter within the range of 0.05 to 0.1 $\mu$.

We claim:

1. In the process for the production of an aqueous colloidal dispersion of tetrafluoroethylene polymer wherein tetrafluoroethylene monomer is progressively introduced into a reaction vessel and polymerized in the presence of water, a catalyst and a dispersing agent; the improvement comprising progressively introducing a fluorinated or chlorofluorinated anionic dispersing agent into the reaction vessel at a rate which increases the concentration of dispersing agent with respect to water as the total surface area of the polymer particles formed increases, a small concentration of dispersing agent being present prior to the beginning of polymerization and the rate of introduction of dispersing agent being such that at each instant during polymerization dispersing agent is present in a concentration theoretically sufficient to provide continuous coverage of at least 60 percent of the surface of the polymer particles present at such instance but is not present in excess of about 10 percent of the theoretical concentration to provide complete coverage of the surface of said particles at any instance after the initial stage of polymerization.

2. The process of claim 1 wherein the dispersing agent consists of an alkali or ammonium salt of a fluoric or chlorofluoric aliphatic carboxylic acid having a chain length of at least 6 carbon atoms.

3. The process of claim 1 wherein the polymerization is carried out at a pressure between 5 and 25 atmospheres.

4. The process of claim 1 wherein the monomer and dispersing agent are added in successive doses.

5. The process of claim 1 wherein the dispersing agent is produced in situ from a compound present in the reaction vessel and a compound which is added in the course of polymerization.

6. The process of claim 1 wherein the catalyst is a mineral redox system comprising potassium persulfate and ferrous sulfate.

7. The process of claim 1 wherein the the catalyst is an organic peroxide.

8. The process of claim 1 wherein the polymerization is carried out in the presence of paraffin oil.